(12) United States Patent
Decker et al.

(10) Patent No.: US 11,579,026 B2
(45) Date of Patent: Feb. 14, 2023

(54) TESTING METHOD FOR NON-INVASIVE TEMPERATURE MEASURING INSTRUMENTS

(71) Applicant: ABB Schweiz AG, Baden (CH)

(72) Inventors: Andreas Decker, Vechta (DE); Joerg Gebhardt, Mainz (DE); Peter Ude, Hanau (DE); Juergen Horstkotte, Enger (DE); Wilhelm Daake, Petershagen (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/530,597

(22) Filed: Nov. 19, 2021

(65) Prior Publication Data

US 2022/0074798 A1 Mar. 10, 2022

Related U.S. Application Data

(63) Continuation of application No. PCT/EP2020/063623, filed on May 15, 2020.

(30) Foreign Application Priority Data

May 21, 2019 (EP) .................................. 19175757

(51) Int. Cl.
*G01K 1/143* (2021.01)
*G01K 15/00* (2006.01)

(52) U.S. Cl.
CPC ........... *G01K 15/007* (2013.01); *G01K 1/143* (2013.01); *G01K 15/005* (2013.01)

(58) Field of Classification Search
CPC .... G01K 15/007; G01K 1/143; G01K 15/005; G01K 15/00
See application file for complete search history.

(56) References Cited

U.S. PATENT DOCUMENTS

| | | | | |
|---|---|---|---|---|
| 3,759,083 A | * | 9/1973 | Erickson | ................ G01K 15/00 324/617 |
| 4,346,864 A | * | 8/1982 | Feller | ....................... G01K 1/16 374/E1.019 |

(Continued)

FOREIGN PATENT DOCUMENTS

| CA | 2598266 A1 | * | 1/2006 |
|---|---|---|---|
| CN | 102313758 A | * | 1/2012 |

(Continued)

*Primary Examiner* — Gail Kaplan Verbitsky
(74) *Attorney, Agent, or Firm* — Leydig, Voit & Mayer, Ltd.

(57) ABSTRACT

A method for testing a temperature measuring instrument is presented, where the instrument includes at least one sensor that changes its electrical resistance, and/or an electrical voltage that it produces, in response to being exposed to a change in temperature, and where the instrument is configured to be coupled to an object of interest. The method includes changing the temperature of at least one sensor by an amount that is detectable given the measurement resolution of the at least one sensor, by driving an electrical manipulation current through this sensor; obtaining one or measurement values from at least one sensor; and evaluating a state of the measuring instrument, a state of one or more of its sensors, and/or a state of a coupling to an object of interest, from the one or more measurement values.

10 Claims, 2 Drawing Sheets

(56) References Cited

U.S. PATENT DOCUMENTS

| | | | | |
|---|---|---|---|---|
| 4,399,823 A * | 8/1983 | Donnelly | A61B 5/01 | |
| | | | 600/549 | |
| 4,795,884 A * | 1/1989 | Carroll | G01K 15/00 | |
| | | | 374/185 | |
| 4,967,593 A * | 11/1990 | McQueen | G01F 23/248 | |
| | | | 210/744 | |
| 4,969,459 A * | 11/1990 | Gusakov | G05D 23/24 | |
| | | | 219/494 | |
| 6,519,546 B1 * | 2/2003 | Eryurek | G08C 19/02 | |
| | | | 374/1 | |
| 10,364,555 B2 * | 7/2019 | Trescott | G01M 3/002 | |
| 2002/0048309 A1 | 4/2002 | Blankenagel | | |
| 2004/0125856 A1 * | 7/2004 | Sprock | G01K 1/024 | |
| | | | 374/E1.004 | |
| 2005/0281313 A1 * | 12/2005 | Qian | G01K 11/22 | |
| | | | 702/131 | |
| 2011/0320045 A1 * | 12/2011 | Salsbury | F24F 11/30 | |
| | | | 714/48 | |
| 2014/0140364 A1 * | 5/2014 | Charles | G01K 15/005 | |
| | | | 374/178 | |
| 2014/0338712 A1 * | 11/2014 | Porod | H01L 35/32 | |
| | | | 136/200 | |
| 2015/0247828 A1 * | 9/2015 | Ruellan | G01N 27/18 | |
| | | | 73/25.05 | |
| 2016/0178456 A1 * | 6/2016 | Yum | G01K 13/00 | |
| | | | 374/152 | |
| 2017/0298807 A1 * | 10/2017 | Gubel | G01K 7/22 | |
| 2022/0260432 A1 * | 8/2022 | Lei | G01K 1/143 | |
| 2022/0268645 A1 * | 8/2022 | Hanson | G01K 15/007 | |

FOREIGN PATENT DOCUMENTS

| | | | | |
|---|---|---|---|---|
| CN | 105785102 A * | 7/2016 | | G01R 19/0084 |
| DE | 102015105819 B4 | 1/2018 | | |
| EP | 0778000 A1 * | 11/1997 | | |
| EP | 2664905 A2 * | 11/2013 | | |
| EP | 2729777 A1 | 5/2014 | | |
| EP | 3764070 A1 * | 1/2021 | | G01K 1/026 |
| JP | 59026024 A * | 2/1984 | | |
| JP | H07225530 A | 8/1995 | | |
| JP | 2009079965 A | 4/2009 | | |
| JP | 2010-101859 A | 5/2010 | | |
| JP | 2017161412 A * | 9/2017 | | |

* cited by examiner

TESTING METHOD FOR NON-INVASIVE TEMPERATURE MEASURING INSTRUMENTS

CROSS-REFERENCE TO PRIOR APPLICATIONS

This application is a continuation of International Patent Application No. PCT/EP2020/063623, filed on May 15, 2020, which claims priority to European Patent Application No. EP 19175757.4, filed on May 21, 2019. The entire disclosure of both applications is hereby incorporated by reference herein.

FIELD

One or more embodiments of the present invention may relate to non-invasive temperature measuring instruments that may, inter alia, be used to measure surface temperatures of pipes and other vessels in industrial plants.

BACKGROUND

In industrial plants, temperatures of media in pipes or other vessels belong to the most important parameters that are to be monitored in the course of an industrial process. Non-invasive temperature measuring instruments are instruments that are attached to an outside surface of the vessel and locally measure the temperature on this outside surface with one or more sensors. By suitably evaluating the measured temperature, the temperature inside the vessel may be derived.

Compared with invasive measuring instruments that are directly inserted into the medium inside the vessel, non-invasive measuring instruments do not impede the flow of the medium and are not attacked by a chemically aggressive medium. Moreover, adding and removing such instruments does not require a temporary shutdown of the plant.

The thermal contact between the non-invasive measuring instrument and the outer wall of the vessel, and hence also the thermal contact between the instrument and the medium, may degrade over time. Therefore, German patent DE 10 2015 105 819 B4 discloses a method for testing such instruments. Heat is locally applied to the outside wall of the vessel by a temporary heat source, and the effect that this has on the measurement values obtained from the sensors is evaluated to check whether the calibration of the instrument is still correct.

SUMMARY

In an embodiment, the present invention provides a method for testing a temperature measuring instrument, wherein the temperature measuring instrument comprises at least one sensor that changes its electrical resistance, and/or an electrical voltage that it produces, in response to being exposed to a change in temperature, and wherein the temperature measuring instrument is configured to be coupled to an object of interest. The method may comprise: changing the temperature of the at least one sensor by an amount that is detectable given the measurement resolution of the at least one sensor, by driving an electrical manipulation current $I_M$ through this sensor; obtaining one or several measurement values from at least one sensor; and evaluating a state of the temperature measuring instrument, a state of one or more of its sensors, and/or a state of a coupling to the object of interest, from the one or more measurement values.

An objective of the present invention may be to further facilitate said testing of non-invasive temperature measuring instruments and to increase the accuracy of the testing results.

These objectives may be achieved by a testing method, a temperature measuring instrument and a computer program according to the respective independent claims. Further advantageous embodiments are detailed in the respective dependent claims.

BRIEF DESCRIPTION OF THE DRAWINGS

One or more embodiments of the present invention may be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
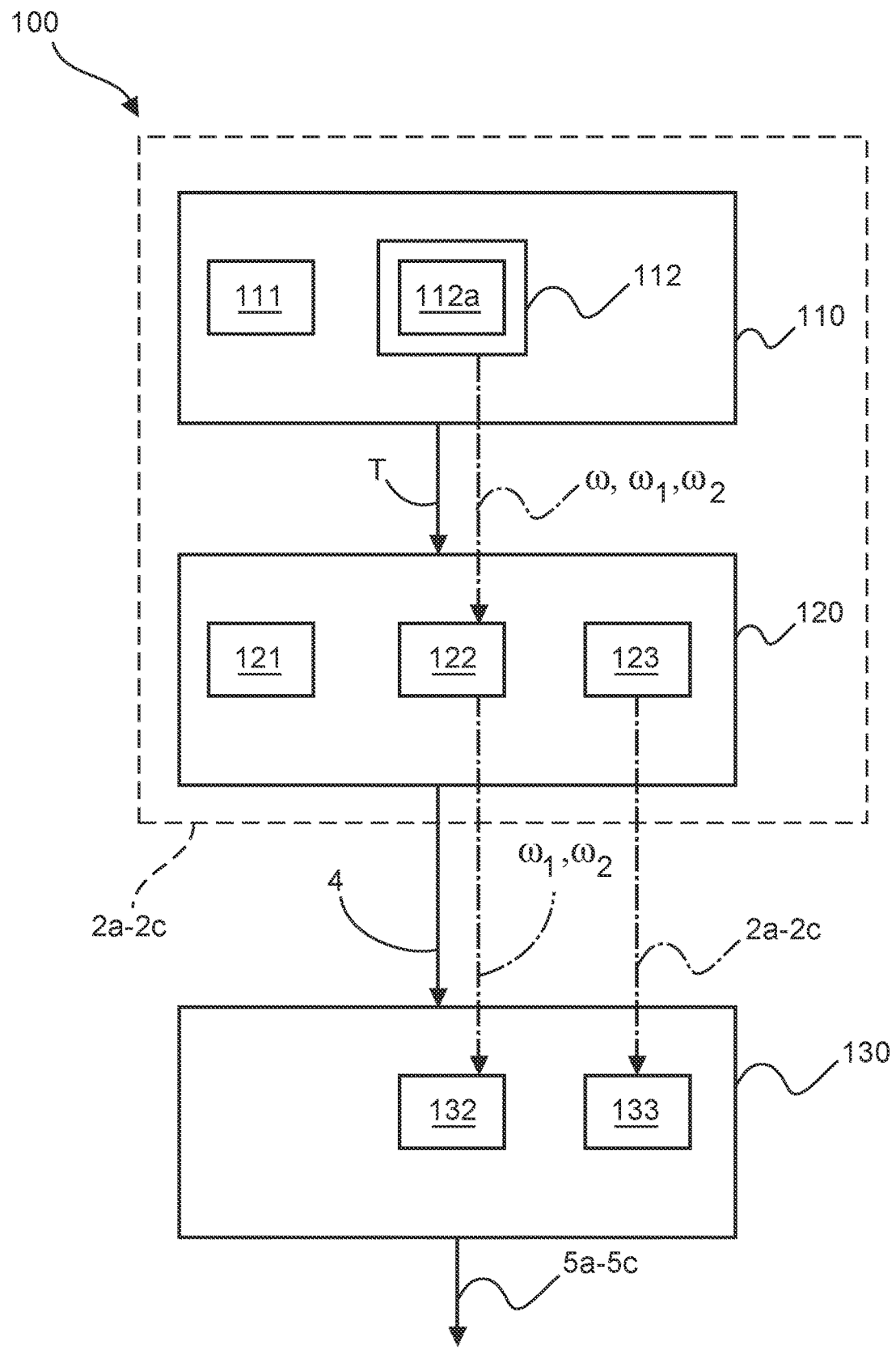
FIG. 1: Exemplary embodiment of the method 100.

The inventors have developed a method for testing a temperature measuring instrument. This instrument comprises at least one sensor that changes its electrical resistance R, and/or an electrical voltage U that it produces, in response to being exposed to a change in temperature T. In one example, the sensor may be a resistive sensor with an ohmic resistance R that sensitively depends on the temperature T. In another example, the sensor may exhibit the Seebeck thermoelectric effect that directly converts a change in the temperature T to a change in the voltage U between the terminals of the sensor.

The instrument is configured to be coupled to an object of interest. For example, it may be a non-invasive temperature measuring instrument with a surface that may be attached to an outside surface of a pipe, vessel or other object of interest. From the temperature T measured on said outside surface, the temperature inside the object of interest may be evaluated as it is customary in the art for such instruments.

According to the testing method, the temperature T of at least one sensor is changed by an amount that is detectable given the measurement resolution dT of the at least one sensor, by driving an electrical manipulation current $I_M$ through this sensor.

When the ohmic resistance of a resistive sensor is measured, this is typically done by driving a small probing current $I_P$ through the sensor and measuring the voltage drop across the sensor. This inevitably dissipates some power P into heat and increases the temperature of the sensor, according to the formula $P=I_P^2 *R$. However, for the sake of measurement accuracy, the probing current $I_P$ is rated so low that this self-heating effect does not have a noticeable effect on the measurement results. For example, well known suppliers of resistive sensors provide Pt100 sensors that are rated to be probed with a maximum probing current $I_P$ of only 1 mA, so that at a self-heating coefficient of 0.4 K/mW, the dissipated power of 0.1 mW results in a self-heating of at most 0.04 K.

The testing method may deliberately use the self-heating effect, which is perceived as an unwanted effect in the prior art, as a heat source for testing. In an exemplary embodiment, the temperature T of the at least one sensor may be changed by an amount of at least 2 Kelvin. A temperature increase of at least 2 Kelvin is far beyond what would be considered acceptable for probing according to the prior art. In the mentioned example of the Pt100 sensor, an electrical manipulation current $I_M$ on the order of 30 mA may be applied, resulting in a power dissipation of 90 mW and a local temperature increase by about 36 K.

Measurement values are obtained from at least one sensor, which may be the same sensor whose temperature T is changed, or a different sensor of a measuring instrument that is equipped with multiple sensors. From the measurement values, a state of the measuring instrument, a state of one or more of its sensors, and/or a state of a coupling to an object of interest, from the one or more measurement values is evaluated.

The inventors have found that by applying the electrical manipulation current $I_M$ and thereby changing the temperature of the sensor, the need for an additional heat source for the testing is obviated. This greatly facilitates the testing because no additional work is necessary to physically apply the additional heat source. In particular, it is not necessary to obtain physical access to the site where the temperature measuring instrument is mounted on the pipe, vessel or other object of interest. Rather, the measurement may be entirely remote-controlled.

Also, the accuracy of the test measurement is improved. In the mentioned use case of monitoring the temperature T of a medium in a pipe or other vessel, the main purpose of the testing is to check whether the thermal path between the sensor and the medium is still in the state that was the basis for the calibration of the instrument, or whether this thermal path has changed. For example, clamps fixing the instrument to a pipe may have loosened over time due to vibration of the pipe. The thermal path between the sensor and the medium may also be impaired by the build-up of deposits inside the vessel, such as fouling, scaling or calcification. By exploiting the self-heating effect, the heat used for testing may be, inter alia, sent onto the very thermal path that is used for temperature sensing during normal operation of the instrument.

Especially in the mentioned case of deposits in the vessel, this makes it more accurate to use the self-heating of the sensor than to use another heat source. Such deposits frequently accumulate in particular places, i.e., deposits may be present on the inside wall in the place where the measuring instrument is mounted on the outside wall, but not in the place where the additional heat source is applied on the outside wall.

While non-invasive measuring instruments that are attached to outside walls of pipes, vessels or other objects of interest are an important use case, the method is not limited to this use case. I.e., the measuring instrument may also be an invasive one that is configured to measure the temperature inside the pipe or vessel. If deposits build up on the part of the measuring instruments that protrudes into the pipe or vessel, this may be detected by means of the method as well.

Also, while the measuring instrument is configured to be coupled to an object of interest, the use of the method is not limited to the state where this coupling has already been performed. Rather, the method may also be used to guide the installation process of the measuring instrument. For example, during installation, the measurement values may be monitored in order to find an optimal thermal contact between the measuring instrument and the object of interest.

For example, if the measuring instrument is fixed to the object of interest by means of clamps or other fixtures that need to be tightened, an optimal thermal coupling may require tightening the clamps or other fixtures with the correct amount of force. If too little force is applied, an air gap may form between the measuring instrument and the object of interest. If too much force is applied, the measuring instrument may tilt or cant, so that a little part of its surface makes good contact with the object of interest, but a much larger part of its surface is drawn out of contact with the object of interest.

Different types of temperature fields may be generated and evaluated by changing the temperature T of at least one sensor. One may consider transient field developments, and/or static spatial distributions of the temperature T in the limit of large times. From the temperature fields and/or their time-dependent course, e.g., decay curves, conclusions on the actual boundary conditions surrounding the measuring instrument may be drawn. Advantageously, a comparison between freshly obtained data and historical data from previous tests may be performed. For example, the historical data may represent a "fingerprint" of an optimal state where the measuring instrument is correctly coupled to the object of interest and is in a correctly working state.

In a particularly advantageous embodiment, the sensor whose temperature T is changed is also a sensor from which measurement values are obtained. This embodiment may also be used on a measuring instrument with only one single sensor. For example, such instruments may be used in places where there is only very little space to install a measuring instrument, and where it would thus be difficult to add another temporary heat source.

Preferably, the measurement values are obtained under the condition that at most a probing current $I_P$, with $0 \leq I_P < I_M$, is flowing through the sensor. As discussed before, resistances are usually measured using a probing current that is low enough not to cause significant self-heating. If the sensor employs the Seebeck effect, its signal is a voltage signal, and no probing current is required.

Measurement values may also be obtained from one or more sensors different from the sensor whose temperature T is changed. In this manner, the distribution of the heat within the measuring instrument may be studied. To this end, in a further particularly advantageous embodiment, measurement values are obtained from at least two such sensors that are different from the sensor whose temperature T is changed.

For example, the evaluation may then comprise fitting a parametrized model for the heat transport between the sensor whose temperature T is changed and the sensors from which the measurement values are obtained, so that the model matches the measurement values. In particular, this may comprise adjusting the parameters of the model so that its predictions for the measurement values at the locations of the sensors from which measurement values are obtained match the measurement values that are actually obtained from these sensors.

If measurement values are obtained from several sensors, this may be used to detect a wider variety of deviations from the proper working state of the measuring instrument. For example, in addition to an improper contact between the measuring instrument and the object of interest, a thermal leak between the sensor whose temperature T is changed and a sensor from which measurement values are obtained may be detected. Also, a thermal leak between one of these sensors and the housing of the measuring instrument may be detected.

In a further, especially advantageous embodiment, at least one sensor is chosen to exhibit the Seebeck thermoelectric effect, and/or to be a Peltier element. Measuring the temperature using the Seebeck effect produces a voltage signal, and measuring this voltage signal does not cause any self-heating. Also, if the sensor is a Peltier element, then the driving of the electrical manipulation current $I_M$ may be used to locally cool the sensor by transporting a certain flow of heat to somewhere else.

In a further, especially advantageous embodiment, the electrical manipulation current $I_M$ is applied at least in part as a pulse with a given pulse shape and a duration of at least a physical time constant $\tau$ of the measuring instrument. The response of the measuring instrument to this defined pulse can then be studied and, for example, compared to a response that the measuring instrument should deliver in a properly working state.

For example, the pulse may be a rectangular pulse or a Gauss pulse. The pulse may then be transferred to the sensor from which measurement values are obtained in a corresponding pulse form. Exemplary key performance indicators that may be evaluated from the measurement values are:

a time delay until an extremum of the temperature T is reached;

a pulse width that may, for example, be compared with the pulse width of the input pulse; and a pulse height that may, for example, be compared with the pulse height of the input pulse.

In a further, especially advantageous embodiment, the electrical manipulation current $I_M$ is applied at least in part as a periodic current with an angular frequency $\omega$ of at most $2\pi/\tau$, wherein $\tau$ is a physical time constant of the measuring instrument. Various means are available to extract such a periodic part from a noisy signal. For example, a lock-in amplifier or a phase locked loop may be used. Therefore, the obtaining of measurement values may advantageously comprise filtering, from the measurement signal of the sensor from which measurement values are to be obtained, a component that is periodic with angular frequency $\omega$.

In a further, especially advantageous embodiment, the electrical manipulation current $I_M$ is applied with at least two different angular frequencies $\omega_1$ and $\omega_2$. If one of the sensors is not working properly, if the thermal contact between the measuring instrument and the object of interest (or the medium inside a vessel that serves as object of interest) is impaired, or if there is a thermal leak in the measuring instrument, this may be described by a transfer function that is applied to one or more relevant flows of heat. Such transfer functions are usually frequency dependent. By analyzing the response of the measuring instrument to electrical manipulation currents $I_M$ having different frequencies, different physical effects that contribute to the observed measurement signal may be distinguished from one another. This facilitates choosing and planning the correct remedial action. If a sensor is faulty, it may be repaired or replaced. If the thermal contact between the measuring instrument and an outer surface of a vessel is impaired because clamps have loosened, the clamps may be re-tightened or replaced. If the thermal contact between the measuring instrument and a medium inside the vessel is impaired by deposits inside the vessel, then the measuring instrument may be mounted in a place where there are no deposits, or the deposits may be cleaned from the inside of the vessel.

A further possible remedy for the mentioned impairments and also other impairments is to apply an appropriate correction in an algorithm with which the measurement values are processed. As discussed above, when the ultimate goal is to measure the temperature of a medium inside a pipe or other vessel, such an algorithm is usually in place to estimate the desired temperature T of the medium from the temperatures T observed by different sensors of the measuring instrument. Any impairment that has been properly identified and/or quantified may be accounted for in such an algorithm, e.g., by means of a corrective term. The mentioned physical remedies (e.g., cleaning deposits out of the pipe, or re-tightening a thermal contact) may then be postponed up to the point in time where the approximation of the impairment by the corrective term is no longer accurate enough, or up to the point in time where the operation of the measurement is no longer satisfactory for some other reason. For example, a continuing build-up of deposits on the inside of the pipe or other vessel may overly delay the propagation of a temperature change from the medium inside the vessel to the measuring instrument outside the vessel.

Therefore, in a further especially advantageous embodiment, the evaluating comprises separating an effect of a change in the measuring instrument on the measurement values from an effect of a change in the coupling of the measuring instrument to an object of interest on the measurement values based on a comparison of measurement values acquired at the two different angular frequencies $\omega_1$ and $\omega_2$.

Changing the temperature T of one sensor by applying an electrical manipulation current $I_M$ requires power. In the case of ohmic self-heating of a sensor, be it a resistive sensor or a sensor based on the Seebeck thermoelectric effect, the full amount of thermal energy that is to be inserted into the measuring instrument needs to be supplied as electrical energy. In the case of heat transport by means of the Peltier effect, a given amount of electrical energy may drive the transport of a higher amount of thermal energy. But even in this case, the amount of electrical power that is available for changing the temperature T of a sensor in the measuring instrument may be limited.

For example, the measuring instrument may be on a 4-20 mA current loop, so that it may communicate a measurement value by the amount of current it draws from the loop. This has the advantage that the measurement value is not altered in transit even on a very long cable. But in the most common case where the current loop is also used as a power supply for the measuring instrument, the whole instrument must be able to function even in a state where it only draws 4 mA from the current loop. In the mentioned exemplary case of the Pt100 sensor, this would not be enough to supply the desired electrical manipulation current $I_M$ of up to 30 mA.

But on the other hand, the testing by means of the method described above is a functionality that does not need to run constantly. Rather, the testing is typically performed when the measuring instrument is first installed, and then it is repeated either at periodic intervals or on request to check whether anything has changed.

Therefore, one or more embodiments of the invention may also provide a temperature measuring instrument. This measuring instrument comprises at least one sensor that changes its electrical resistance R, and/or an electrical voltage U that it produces, in response to being exposed to a change in temperature T. The instrument also comprises an energy source and/or an energy connector that is configured to power, in the course of the method described above, at least the obtaining of one or more measurement values. The energy connector may, for example, be an interface that connects the measuring instrument to a field bus, such as a 4-20 mA current loop, to which it is attached.

The evaluating of the measurement values is still an integral part of the method described above, but this does not need to be performed within the measuring instrument itself. Rather, this may be done remotely from the measuring instrument, using the measurement values obtained from the instrument by the field bus or any other suitable means of communication.

The instrument also comprises an energy storage device that is configured to deliver the electrical manipulation current $I_M$ for the changing of the temperature of at least one sensor. This current $I_M$ is higher than the current available from the energy source and/or the energy connector. The energy storage device is connectable to the energy source and/or energy connector for charging.

In this manner, small amounts of energy may be drawn from the energy source and/or energy connector and "saved up" in the energy storage device for the next time the testing method needs to be performed. For example, if the measuring instrument is powered by said 4-20 mA current loop, then the charging of the energy storage device may be coordinated to happen during periods of time where the instrument draws a higher current to signal a higher measurement value.

The energy storage device may, for example, be a battery or a capacitor, depending on how much energy needs to be stored for which period of time.

The method described above may be computer-implemented and embodied in a software that may actuate one or more temperature measuring instruments, so that the temperature of at least one sensor is changed, measurement values are obtained, and the obtained measurement values are evaluated. Therefore, one or more embodiments of the invention may also provide a computer program, comprising machine-readable instructions that, when executed by one or more computers communicatively coupled with at least one temperature measuring instrument, cause the one or more computers, to perform the method described above.

The computer program may be embodied and sold on a non-transitory machine-readable storage medium, and/or in the form of a download product that may be delivered over a network. One or more embodiments of the present invention may also provide a computer that is equipped with the computer program, and/or the storage medium, and/or the download product.

FIG. 1 is a flow chart of an exemplary embodiment of the method 100 for testing a temperature measuring instrument 1. In step 110, the temperature T of at least one sensor 2a-2c of the measuring instrument 1 is changed by driving an electrical manipulation current $I_M$ through at least one sensor 2a-2c, in order to generate a thermal field that may then be picked up by the same or other sensors 2a-2c.

Exemplary ways of applying the electrical manipulation current $I_M$, which may be employed individually or in combination, are given inside box 110. According to block 111, the electrical manipulation current $I_M$ may be applied at least in part as a pulse with a duration of at least a physical time constant τ of the measuring instrument 1. According to block 112, the electrical manipulation current $I_M$ may be applied at least in part as a periodic current with an angular frequency ω of at most 2π/τ, wherein τ is a physical time constant of the measuring instrument 1. According to sub-block 112a within block 112, at least two different angular frequencies $\omega_1$ and $\omega_2$ may be used.

In step 120, one or more measurement values 4 are obtained from at least one sensor 2a-2c.

Exemplary ways of obtaining the measurement values 4, which may be employed individually or in combination, are given inside box 120. According to block 121, during the obtaining, a probing current $I_P$ through the sensor 2a-2c may be limited to a value that is much smaller than the electrical manipulation current $I_M$ and does not result in significant self-heating of the sensor 2a-2c. According to block 122, a component of the measurement signal with the frequencies ω, $\omega_1$, $\omega_2$ used for applying the electrical manipulation current may be filtered from the measurement signal of the sensor 2a-2c from which the measurement values 4 are to be obtained. According to block 123, at least two sensors 2a-2c different from the sensor 2a-2c whose temperature T is changed may be used for picking up measurement values 4.

In step 130, the measurement values 4 are evaluated. As the result, a state 5a of the measuring instrument 1, a state 5b of one or more of its sensors, and/or a state 5c of a coupling of the measuring instrument 1 to an object of interest 3, is obtained. As discussed before, said coupling of the measuring instrument 1 to the object of interest 3 may comprise the thermal coupling to a medium inside a pipe or other vessel that serves as object of interest 3. This thermal coupling may be impaired by the build-up of deposits inside the vessel that thermally insulate the medium from the wall of the vessel.

Exemplary ways of evaluating the desired state 5a-5c from the measurement values 4, which may be employed individually or in combination, are given inside box 130. According to block 132, the dependency of the measurement values on the frequencies $\omega_1$, $\omega_2$ used for applying the electrical manipulation current may be exploited to distinguish different physical effects on the propagation of the generated thermal field from one another. According to block 133, a parametrized model for the heat transport within the measuring instrument 1 may be fitted to the actual distribution of the thermal field by adapting the parameters of the model, so that the model best reproduces the measurement values 4 that are actually obtained by the different sensors 2a-2c.

Figure 2:
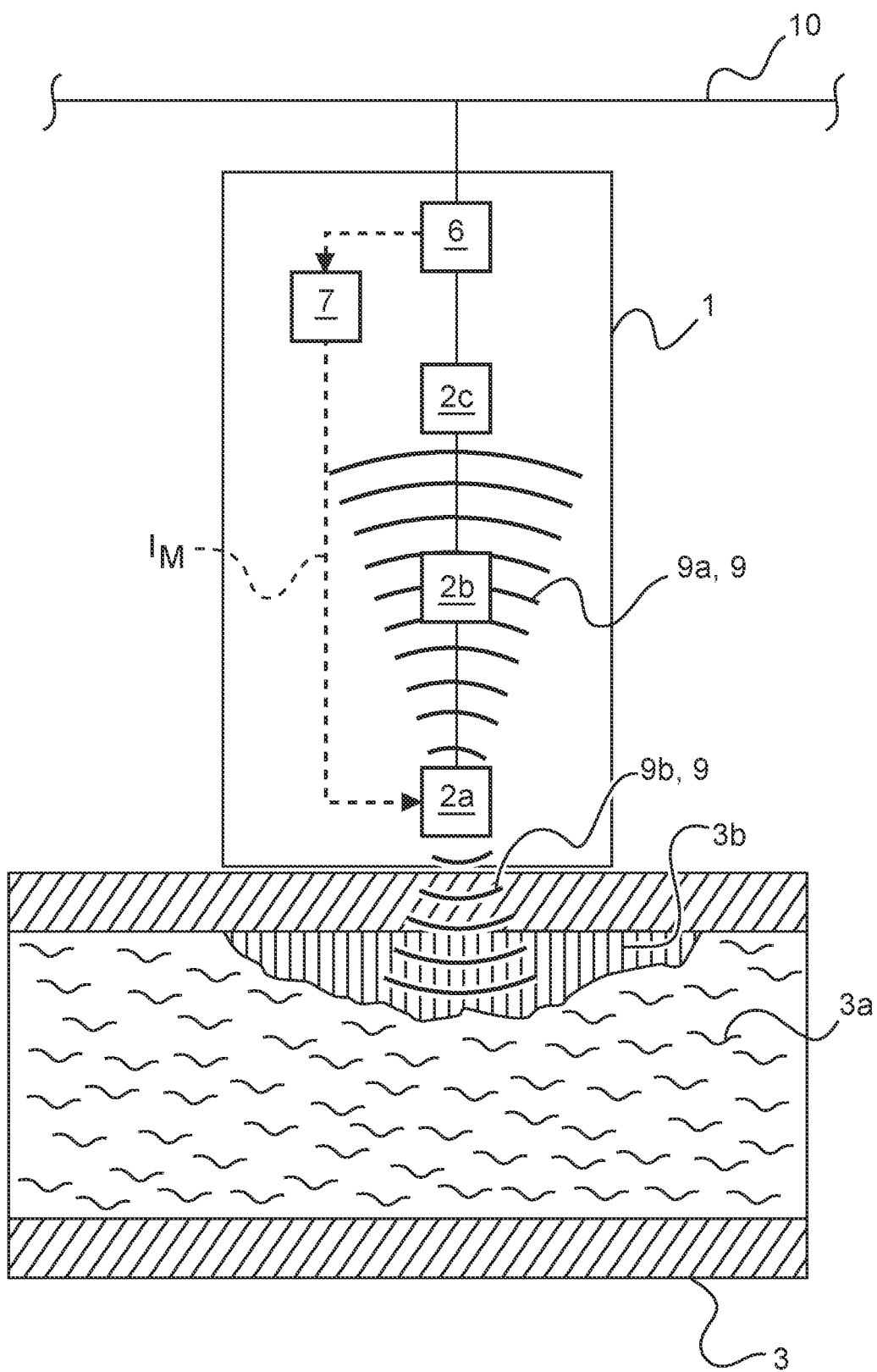
FIG. 2: Exemplary embodiment of the temperature measuring instrument 1.

FIG. 2 shows an exemplary embodiment of a measuring instrument 1 in a state where it is attached to the outer wall of a pipe that serves as object of interest 3. Means for the attachment (such as clamps) have been omitted in FIG. 2 for clarity.

The measuring instrument 1 comprises three sensors 2a-2c. The sensor 2a that is closest to the contact surface with the pipe 3 is configured to be heated by an electrical manipulation current $I_M$ for testing according to the method 100. The other sensors 2b and 2c are used to measure the thermal field generated by the heated sensor 2a.

The measuring instrument 1 is connected to a 4-20 mA current loop 10 by an interface 6 that also serves as the energy connector for powering the measuring instrument 1 with the current drawn from the current loop 10. The measuring instrument 1 further comprises an energy storage device 7. This energy storage device 7 accumulates energy received from the interface 6 and delivers the electrical manipulating current $I_M$ to the sensor 2a when the measuring instrument 1 is tested. In this manner, a higher current than can be drawn by interface 6 is temporarily available as electrical manipulating current $I_M$.

The thermal field 9 that is generated by the heated sensor 2a substantially has two components 9a, 9b that propagate in different directions. The component 9a propagates inside the measuring instrument 1 to sensor 2b and then onwards to sensor 2c. The component 9b propagates into the wall of the pipe 3 and into the medium 3a contained therein. In the example shown in FIG. 2, the latter thermal flow is impeded by the build-up of deposits 3b on the inner wall of the pipe 3, because these deposits 3b are thermally insulating. Since the total amount of heating power dissipated in the sensor 2a is fixed, this causes the first component 9a of the thermal field that propagates within the measuring instrument 1 to increase, which will be picked up by the sensors 2b and 2c.

While one or more embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 temperature measuring instrument
2a-2c sensors in measuring instrument 1
3 object of interest, e.g., pipe or other vessel
3a medium in object of interest 3
3b deposits in object of interest 3
4 measurement values
5a state of measuring instrument 1
5b state of one or more sensors 2a-2c
5c state of coupling of instrument 1 to object of interest 3
6 energy source/energy connector of instrument 1
7 energy storage device for delivering manipulation current $I_M$
9 thermal field generated by changing temperature of sensor 2a-2c
9a, 9b components of thermal field 9
10 current loop
100 method for testing measuring instrument 1
110 changing temperature of sensor 2a-2c
111 applying manipulation current $I_M$ as pulse
112 applying periodic manipulation current $I_M$ with frequency $\omega$
112a using at least two different frequencies $\omega_1$, $\omega_2$
120 obtaining measurement values 4 from sensor 2a-2c
121 limiting probing current $I_P$ during obtaining 120
122 filtering periodic component from measurement signal
123 obtaining values 4 from at least two different sensors 2a-2c
130 evaluating state 5a-5c from measurement values 4
132 discriminating effects using frequency $\omega$ dependence of values 4
133 fitting model for heat transport to measurement values 4
dT measurement resolution of sensor 2a-2c
$I_M$ electrical manipulation current
$I_P$ probing current
$\omega$, $\omega_1$, $\omega_2$ angular frequencies

What is claimed is:

1. A method for testing a temperature measuring instrument, wherein the temperature measuring instrument comprises a plurality of sensors, each of the plurality of sensors changing its electrical resistance R, and/or an electrical voltage U that it produces, in response to being exposed to a change in temperature T, and wherein the temperature measuring instrument is configured to be coupled to an object of interest, the method comprising:
    changing the temperature T of a first sensor of the plurality of sensors by an amount that is detectable given the temperature measurement resolution dT of the first sensor, by driving an electrical manipulation current $I_M$ through the at least one sensor;
    obtaining one or several measurement values from a second sensor of the plurality of sensors that is different from the first sensor whose temperature T is changed; and
    evaluating a state of a thermal coupling to the object of interest from the one or several values from the second sensor,
    wherein the object of interest comprises a pipe or vessel; and the temperature measuring instrument is configured to monitor the temperature of a medium in the pipe or vessel,
    wherein the electrical manipulation current $I_M$ is applied at least in part as a periodic current with an angular frequency of at most $2\pi/\tau$, wherein $\tau$ is a physical time constant of the temperature measuring instrument,
    wherein the electrical manipulation current $I_M$ is applied with at least two different angular frequencies, and
    wherein the evaluating comprises: distinguishing a change in the temperature measuring instrument from a change in the coupling of the temperature measuring instrument to an object of interest based on a comparison of measurement values acquired at the two different angular frequencies.

2. The method of claim 1, wherein the temperature T of the first sensor is changed by an amount of at least 2 Kelvin.

3. The method of claim 1, wherein the evaluating comprises: fitting a parametrized model for the heat transport between the first sensor whose temperature T is changed and the second sensor from which the measurement values is obtained, so as to match the measurement values.

4. The method of claim 1, wherein at least one sensor of the plurality of sensors is chosen to exhibit the Seebeck thermoelectric effect, and/or to be a Peltier element.

5. The method of claim 1, wherein the electrical manipulation current $I_M$ is applied at least in part as a pulse with a given pulse shape and a duration of at least a physical time constant $\tau$ of the temperature measuring instrument.

6. The method of claim 1, wherein the obtaining of measurement values comprises filtering, from the measurement signal of the second sensor from which measurement values are to be obtained, a component that is periodic with angular frequency.

7. A computer program, comprising machine-readable instructions that, when executed by one or more computers communicatively coupled with at least one temperature measuring instrument, cause the one or more computers to perform the method of claim 1.

8. A non-transitory machine-readable storage medium, and/or a download product, with the computer program of claim 7.

9. A computer, equipped with the computer program, and/or with a non-transitory machine-readable storage medium and/or a download product with the computer program, of claim 7.

10. The method of claim 1, wherein evaluating comprises applying an algorithm to the one or more measurement values, and wherein when the coupling between the temperature measuring instrument and the object of interest is impaired, a corrective term is added to the algorithm.

* * * * *